May 12, 1925.  1,537,819
J. GRIMM
NUT AND BOLT LOCK
Filed July 17, 1924
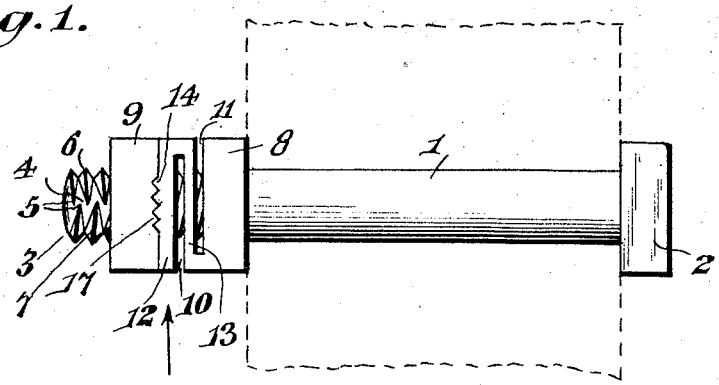
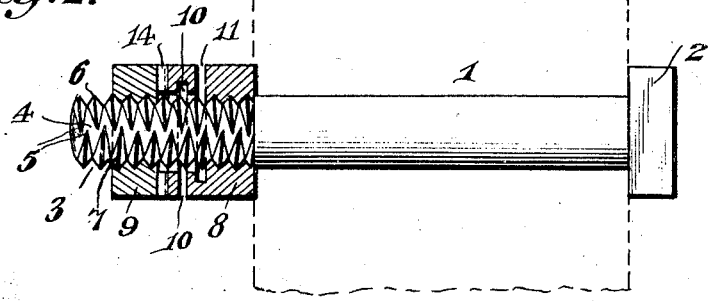
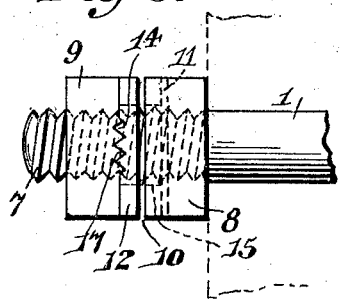   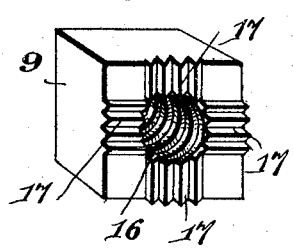   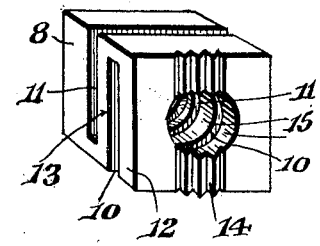
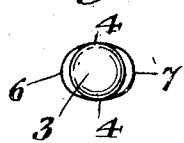
Jesse Grimm, INVENTOR.
BY
Geo. P. Kimmel, ATTORNEY Patented May 12, 1925.

1,537,819

UNITED STATES PATENT OFFICE.

JESSE GRIMM, OF DOVER, OHIO.

NUT AND BOLT LOCK.

Application filed July 17, 1924. Serial No. 726,491.

*To all whom it may concern:*

Be it known that I, JESSE GRIMM, a citizen of the United States, residing at Dover, in the county of Tuscarawas and State of Ohio, have invented certain new and useful Improvements in Nut and Bolt Locks, of which the following is a specification.

This invention relates to nut and bolt locks and has for its primary object to provide, in a manner as hereinafter set forth, an improved means for locking a nut upon a bolt without the use of locking keys, pawls, washers or devices other than the nuts which engage the bolt ends.

Another object of the invention is the provision, in a manner as hereinafter set forth, of a nut and bolt lock, having superposed nuts one acting to distort a portion of the other to set up a locking action between the two, and the invention further provides a bolt having right and left hand threads crossing one another so that right and left hand threaded nuts, each having an internal diameter equal to the other, may be threaded upon the bolt.

A final object is the provision in a manner as hereinafter set forth, of a nut and bolt lock of simple design, efficient, positive in action, devoid of numerous parts, and inexpensive to produce.

The invention will be best understood from a consideration of the following detailed description taken in connection with the accompanying drawings forming part of this specification with the understanding that the invention is not confined to any strict conformity with the showing of the drawings but may be changed and modified so long as such changes and modifications mark no material departure from the salient features of the invention as expressed in the appended claims.

In the drawings:—

Figure 1 is a side elevation of a bolt and locking nut therefor in accordance with this invention.

Figure 2 is a view similar to Figure 1 with the nuts being shown in section.

Figure 3 is a view of Figure 1 looking in the direction of the arrow.

Figure 4 is a detail perspective view of the locking nut.

Figure 5 is a detail perspective view of the spring nut, and,

Figure 6 is an end view of the bolt showing more clearly the particular formation thereof.

Referring now to the drawings in detail wherein like numerals of reference indicate corresponding parts throughout the several views shown, a bolt shank is indicated at 1, having the head 2 and having its free end threaded as at 3.

In threading the end of the shank right hand threads are run on first upon the shank, and after this a left hand threader is run on over the right hand threads, the threads crossing at two sides as at 5, and the bolt appears at though flattened as at 4. Thus there are formed upon the end of the bolt, both right and left hand threads 6 and 7, respectively, each of the right and left hand threads having two terminal ends which terminate at opposite sides of the bolt, as is clearly shown in Figure 2 of the drawing.

The locking means comprises a pair of superposed nuts 8 and 9 respectively, the inner nut 8, is provided with right hand threads to engage the right hand threads 6 of the bolt and this nut is further provided with a pair of transversely extending cuts or slots 10 and 11, these slots being cut into the nut from opposite sides and adjacent one end thereof. The slots are extended to a point cross and adjacent the opposite side of the nut thus forming the spring portions 12 and 13. The nut 8 further has one surface provided with serrations 14, the purpose of which will be made apparent. The central bore 15 of the nut 8 is threaded only from one end to the first of the transverse slots, and from there on the bore is of sufficient diameter to allow the threaded end of the shank 1 to pass freely therethrough.

The outer or locking nut 9 has its bore 16 threaded throughout, and this nut 9 further has transversely extending crossed serrations 17 upon one face.

In operation the bolt 1 is passed through the material in which it is to be placed and the spring nut is threaded on the threaded end of the shank, with the serrations 14 facing outwardly. When this nut engages the material in which the bolt is placed and is tightly forced thereagainst, the lock nut 9 is then threaded on the shank, this nut being provided with left hand threads it is turned on in an opposite direction to the direction in which the nut 8 was placed on the bolt. The serrated face 17 of the lock nut 9 is turned inwardly to oppose the serrations 14 upon the spring nut and when the lock nut is forced thereagainst it will tend to distort the inner nut 8 pressing the spring arms 12 and 13 downwardly and when the serrations 17 and 14 become alined they will lock together, the spring action of the arms 12 and 13 acting to force the teeth of the two serrated faces in engagement. In this manner a positive and secure locking action is set up between the two nuts and since one is provided with right hand threads and the other with left hand threads it is impossible for the two to be unscrewed from the shank together.

Having thus described my invention what I claim is:

1. In a nut and bolt lock, the combination with a bolt having intersecting right and left hand threads, of a pair of superposed nuts, one having right and the other left hand threaded bores, one of said nuts having its bore threaded through approximately one-half its length and having the remainder thereof of increased diameter and unthreaded, said last mentioned nut having a pair of slots cut thereinto from opposite faces thereof, each extending to a point adjacent the opposite side to set up a resilient portion adapted to be distorted by the first mentioned nut seating thereon, one of the slots being at the inner end of, and the other at the central portion of, the threadless bored portion of the nut.

2. In a nut and bolt lock, the combination with a bolt having intersecting right and left hand threads, of a pair of superposed nuts one having right and the other left hand threaded bores, one of said nuts having its bore threaded through approximately one-half its length and having the remainder thereof of increased diameter and unthreaded, said last mentioned nut having a pair of slots cut thereinto from opposite faces thereof each extending to a point adjacent the opposite side to set up a resilient portion adapted to be distorted by the first mentioned nut seating thereon, one of the slots being at the inner end of, and the other at the central portion of, the threadless bored portion of the nut, and transverse teeth formed upon the abutting faces of said nuts to set up a locking engagement therebetween.

In testimony whereof, I affix my signature hereto.

JESSE GRIMM.